(12) United States Patent
Roy

(10) Patent No.: US 11,983,459 B1
(45) Date of Patent: May 14, 2024

(54) NAME-RECOGNIZING MOBILE DEVICE FOR AUTOMATICALLY ADJUSTING EARPHONE VOLUME

(71) Applicant: Matthew MacGregor Roy, Ottawa (CA)

(72) Inventor: Matthew MacGregor Roy, Ottawa (CA)

( * ) Notice: Subject to any disclaimer, the term of this patent is extended or adjusted under 35 U.S.C. 154(b) by 320 days.

(21) Appl. No.: 17/140,077

(22) Filed: Jan. 3, 2021

Related U.S. Application Data

(60) Provisional application No. 62/960,588, filed on Jan. 13, 2020.

(51) Int. Cl.
| | |
|---|---|
| *H03G 3/32* | (2006.01) |
| *G06F 3/16* | (2006.01) |
| *G10L 17/26* | (2013.01) |
| *H04R 1/10* | (2006.01) |
| *G10L 15/08* | (2006.01) |

(52) U.S. Cl.
CPC .............. *G06F 3/165* (2013.01); *G10L 17/26* (2013.01); *H04R 1/1091* (2013.01); *G10L 2015/088* (2013.01); *H04R 2420/01* (2013.01)

(58) Field of Classification Search
CPC ........ H04R 1/10; H04R 27/00; H04R 29/007; H04B 1/082; H03G 3/32
USPC .................................. 381/74, 82, 86, 56–57
See application file for complete search history.

(56) References Cited

U.S. PATENT DOCUMENTS

| | | | | |
|---|---|---|---|---|
| 9,160,848 | B2* | 10/2015 | Kim | H04M 3/4936 |
| 10,522,154 | B2* | 12/2019 | Olaya | G10L 17/24 |
| 2008/0077323 | A1* | 3/2008 | Boysen | G01C 21/3608 |
| | | | | 701/431 |
| 2015/0109149 | A1* | 4/2015 | Duncan | G02B 27/01 |
| | | | | 340/944 |
| 2016/0014497 | A1* | 1/2016 | Chizi | H04R 1/1091 |
| | | | | 381/74 |
| 2018/0091638 | A1* | 3/2018 | Torres | H04W 52/0251 |
| 2018/0124154 | A1* | 5/2018 | Watson | H04M 1/6091 |
| 2018/0211660 | A1* | 7/2018 | Bastide | A61M 21/02 |
| 2018/0322861 | A1* | 11/2018 | Ibrahim | H04R 29/008 |
| 2019/0069069 | A1* | 2/2019 | Radin | H03G 3/32 |
| 2021/0144463 | A1* | 5/2021 | Gong | H04R 1/1091 |

* cited by examiner

*Primary Examiner* — George C Monikang

(57) ABSTRACT

A mobile device has a memory storing a name of a user of the mobile device, an audio output interface for outputting an audio signal to earphones worn by the user of the mobile device and a microphone configured to receive a sound signal external to the earphones. A processor is communicatively connected to the microphone to process the sound signal to recognize speech in response to the processor detecting that the audio output interface is outputting the audio signal to the earphones. The processor is configured to determine if the speech includes the name of the user stored in the memory of the mobile device. The processor is configured to generate and provide a volume control signal to the audio output interface to lower a volume of the earphones in response to determining that the speech includes the name of the user.

18 Claims, 13 Drawing Sheets

NAME-RECOGNIZING MOBILE DEVICE FOR AUTOMATICALLY ADJUSTING EARPHONE VOLUME

CROSS-REFERENCE TO RELATED APPLICATIONS

This application claims priority from U.S. Provisional Patent Application 62/960,588 filed Jan. 13, 2020.

TECHNICAL FIELD

The present invention relates generally to earphones and, in particular, to automatic adjustment of earphone volume.

BACKGROUND

Mobile devices such as smart phones may be connected to, or wirelessly paired with, earphones. The user of the mobile device may thus listen to music or podcasts, watch videos, engage in telephone calls, or listen to other audio content via the earphones. The earphones may be earbuds or headphones having left and right speakers for stereo sound. The earphones may be connected by a wired connection via a port, jack or socket in the mobile device or they may be wirelessly paired via a Bluetooth® interface or other such wireless technology.

Users wearing earphones often cannot hear another person speaking to them or trying to get their attention, especially when the volume of the earphones is high. A technical solution to this problem would be highly desirable.

SUMMARY

In general, the present invention provides a mobile device that automatically controls a volume of earphones connected to the mobile device when a name of the user of the mobile device is recognized. In one implementation, the mobile device identifies the person speaking to the user, for example by identifying the person as a contact stored in a memory of the mobile device, and controls the volume depending on the identity of the person.

One inventive aspect of the disclosure is a mobile device having a memory storing a name of a user of the mobile device, an audio output interface for outputting an audio signal to earphones worn by the user of the mobile device and a microphone configured to receive a sound signal external to the earphones. A processor is communicatively connected to the microphone to process the sound signal to recognize speech in response to the processor detecting that the audio output interface is outputting the audio signal to the earphones. The processor is configured to determine if the speech includes the name of the user stored in the memory of the mobile device. The processor is configured to generate and provide a volume control signal to the audio output interface to lower a volume of the earphones in response to determining that the speech includes the name of the user.

In one implementation, the processor is further configured to execute a voice-recognition module to extract a voice signature from the speech and to compare the voice signature to a plurality of pre-recorded voice signatures associated with contacts of the user to identify the person speaking as one of the contacts as a source of the speech. The pre-recorded voice signatures and contacts are stored in the memory of the mobile device.

In one implementation, the processor is further configured to create the pre-recorded voice signatures from telephone calls, video calls, or voice memos involving the contacts.

In one implementation, the processor determines a tone from the speech and generates the volume control signal based on the tone.

Another inventive aspect of the disclosure is a mobile device having a memory storing a name of a user of the mobile device and an audio output interface for outputting an audio signal to earphones worn by the user of the mobile device. The earphones comprise an always-on microphone configured to receive a sound signal. The mobile device includes a processor communicatively connected to the earphones to process the sound signal from the microphone to recognize speech. The processor is configured to determine if the speech includes the name of the user stored in the memory of the mobile device. The processor is configured to generate and provide a volume control signal to the audio output interface to lower a volume of the earphones in response to determining that the speech includes the name of the user.

In one implementation, the processor is further configured to execute a voice-recognition module to extract a voice signature from the speech and to compare the voice signature to a plurality of pre-recorded voice signatures associated with contacts of the user to identify one of the contacts as a source of the speech. The pre-recorded voice signatures and contacts are stored in the memory of the mobile device.

The foregoing presents a simplified summary of the invention in order to provide a basic understanding of some aspects of the invention. This summary is not an exhaustive overview of the invention. It is not intended to identify essential, key or critical elements of the invention or to delineate the scope of the invention. Its sole purpose is to present some concepts in a simplified form as a prelude to the more detailed description that is discussed later. Other aspects of the invention are described below in relation to the accompanying drawings.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Disclosed herein are various embodiments of a mobile device that controls the volume of connected earphones in response to recognizing a name of the user of the mobile device.

Figure 1:
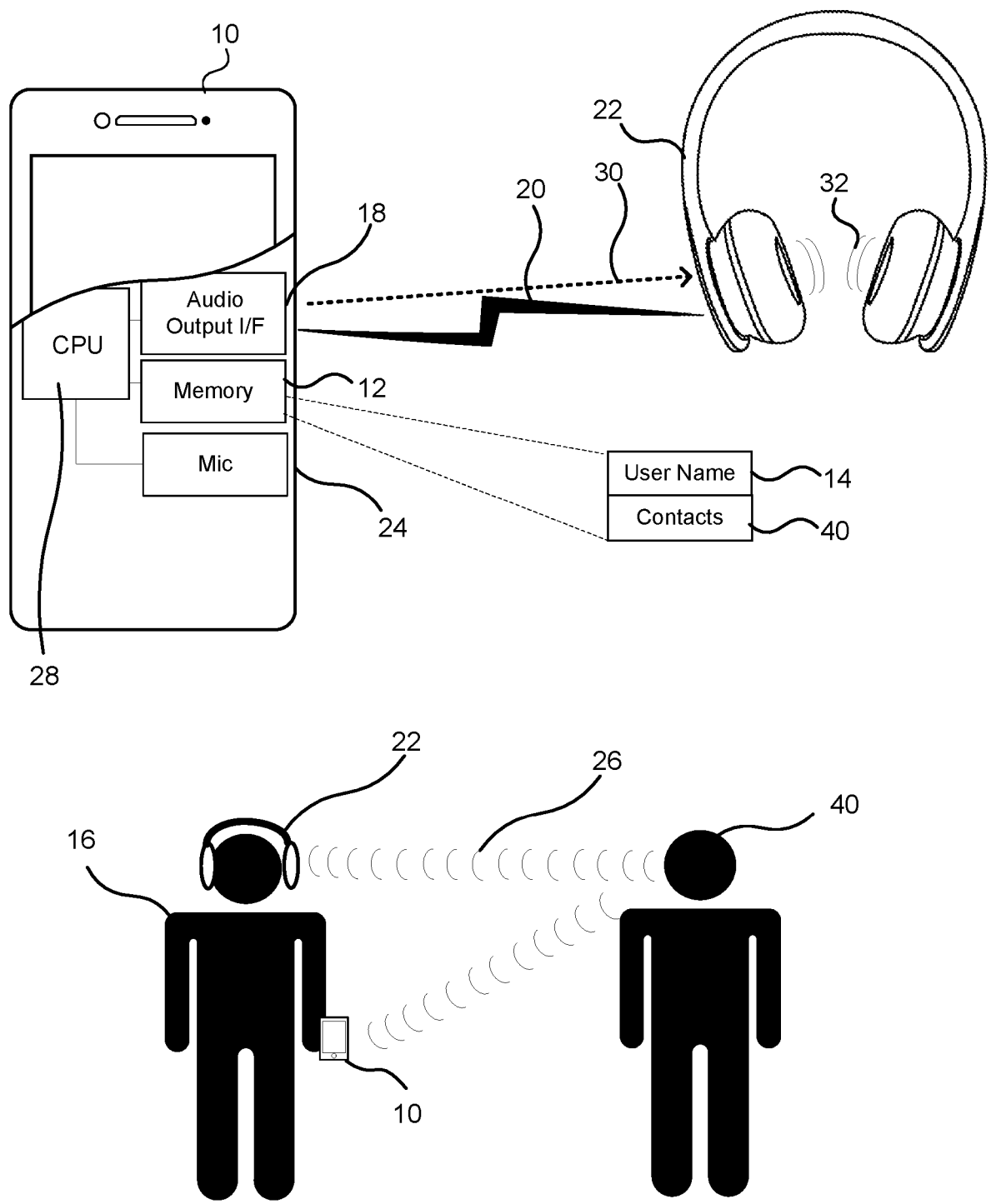
FIG. 1 is a schematic depiction of a name-recognizing mobile device for controlling a volume of connected earphones in accordance with an embodiment of the present invention.

In the embodiment depicted in FIG. 1, a mobile device denoted by reference numeral 10 includes a memory 12 storing a name 14 of a user 16 of the mobile device 10. The mobile device 10 includes an audio output interface 18 for outputting an audio signal 20 to earphones 22 worn by the user 16 of the mobile device 10. The mobile device 10 includes a microphone 24 configured to receive a sound signal 26 external to the earphones 22. The mobile device 10 includes a processor 28 (e.g. central processing unit or CPU) communicatively connected to the microphone 24 to process the sound signal 26 to recognize speech in response to the processor 28 detecting that the audio output interface 18 is outputting the audio signal 20 to the earphones 22. The processor 28 is configured to determine if the speech includes the name 14 of the user 16 stored in the memory 12 of the mobile device 10. The processor 28 is configured to generate and provide a volume control signal 30 to the audio output interface 18 to lower a volume 32 of the earphones 22 in response to determining that the speech includes the name 14 of the user 16. The name may be a first name or last name. The mobile device 10 may learn or receive nicknames for the user which may be recognized in addition to the user's actual name stored in the mobile device. The mobile device may also be configured to recognize a contact-specific nickname, e.g. a particular user may call the user by a certain nickname. The nickname may include shortened forms of a name, e.g. if the user's name is Robert, the nicknames Bob, Rob, Bobby, Robby would be recognized as short forms of the name Robert. The nicknames may also include family names like Dad, Mom, Grandma, Grandpa, etc. The mobile may correlate a recognized nickname with the identity of the contact speaking to the user to determine if the nickname indicates that the contact is addressing the user. For example, the mobile device may recognize a contact's voice as being the user's daughter. If the user's daughter addresses the user by calling him "Dad", the mobile device reacts by interrupting the audio signal to the earphones. The mobile device 10 may be a smart phone, tablet, laptop, or wearable device such as a watch or any other electronic device that includes a processor, microphone and an audio output connection to earphones.

Figure 2:
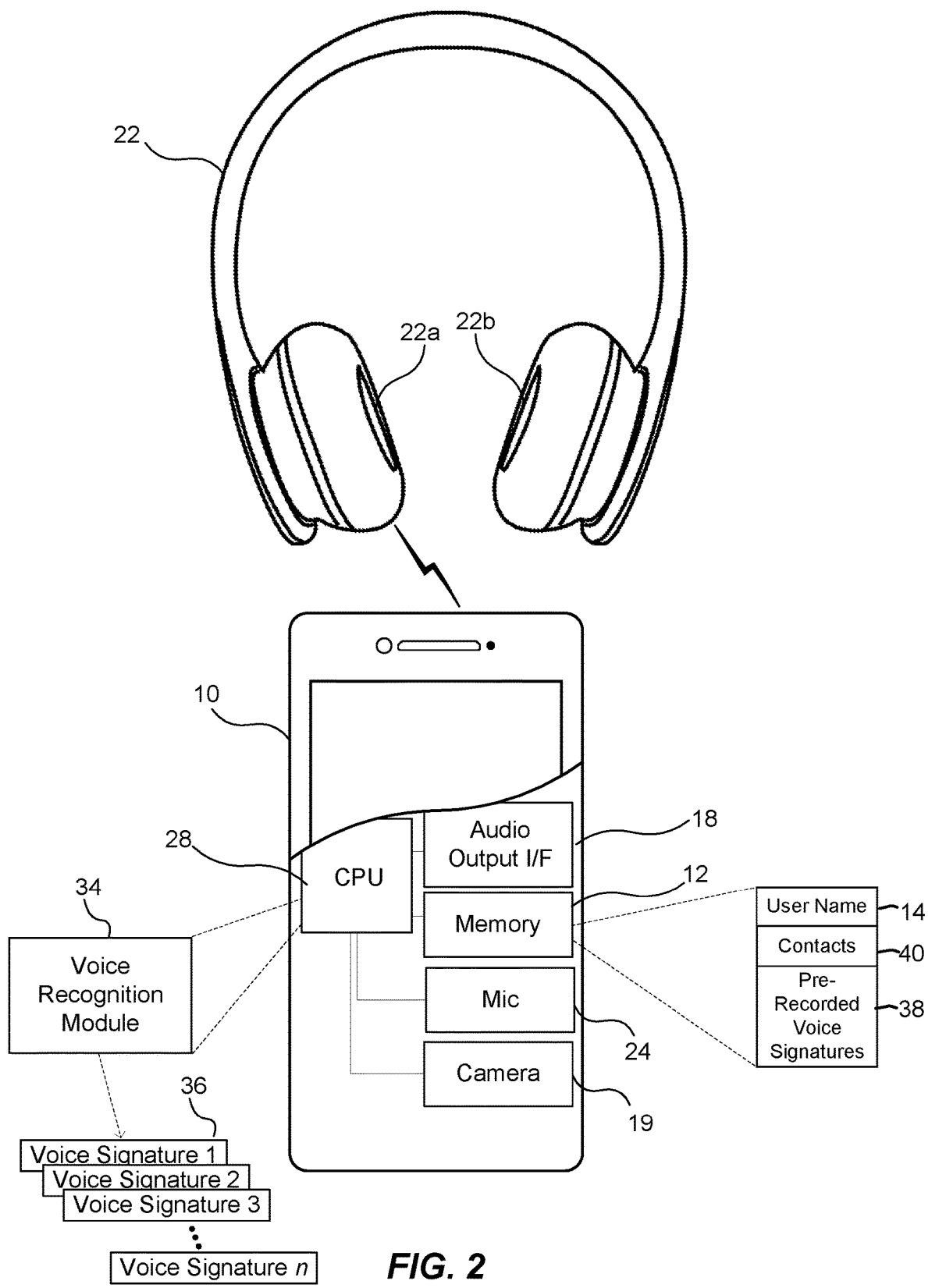
FIG. 2 is a schematic depiction of a mobile device having a voice-recognition module for further recognizing a voice and identifying the contact speaking to the user.

In the embodiment depicted in FIG. 2, the processor 28 of the mobile device 10 is further configured to execute a voice-recognition module 34 to extract a voice signature 36 from the speech of a person who is speaking and to compare the voice signature 36 of the person who is speaking to a plurality of pre-recorded voice signatures 38 associated with contacts 40 of the user 16 to identify one of the contacts 40 as a source of the speech, i.e. to identify the speaking person. In this embodiment, the pre-recorded voice signatures 38 and contacts 40 are stored in the memory 12 of the mobile device 10.

In one embodiment, the processor 28 of the mobile device 10 is further configured to create the pre-recorded voice signatures 38 from telephone calls or video-chats with the contacts 40 or alternatively from voice memos. In one embodiment, the mobile device requests consent from the other person on the call before recording the voice data of the other person.

In one embodiment, as depicted in FIG. 2, the mobile device 10 may include a camera 19 that captures a photo of the user of the mobile device to perform facial recognition to verify the user of the mobile device. In this embodiment, the mobile device may deactivate the name-recognition feature if another person is holding or interacting with the mobile device. The facial recognition enables the mobile device to activate the name-recognition feature only when the registered user (i.e. owner) is the one using the mobile device. In a variant, the mobile device may be configured to have multiple users registered so that the name-recognition feature operates with any of the multiple users.

Figure 3:
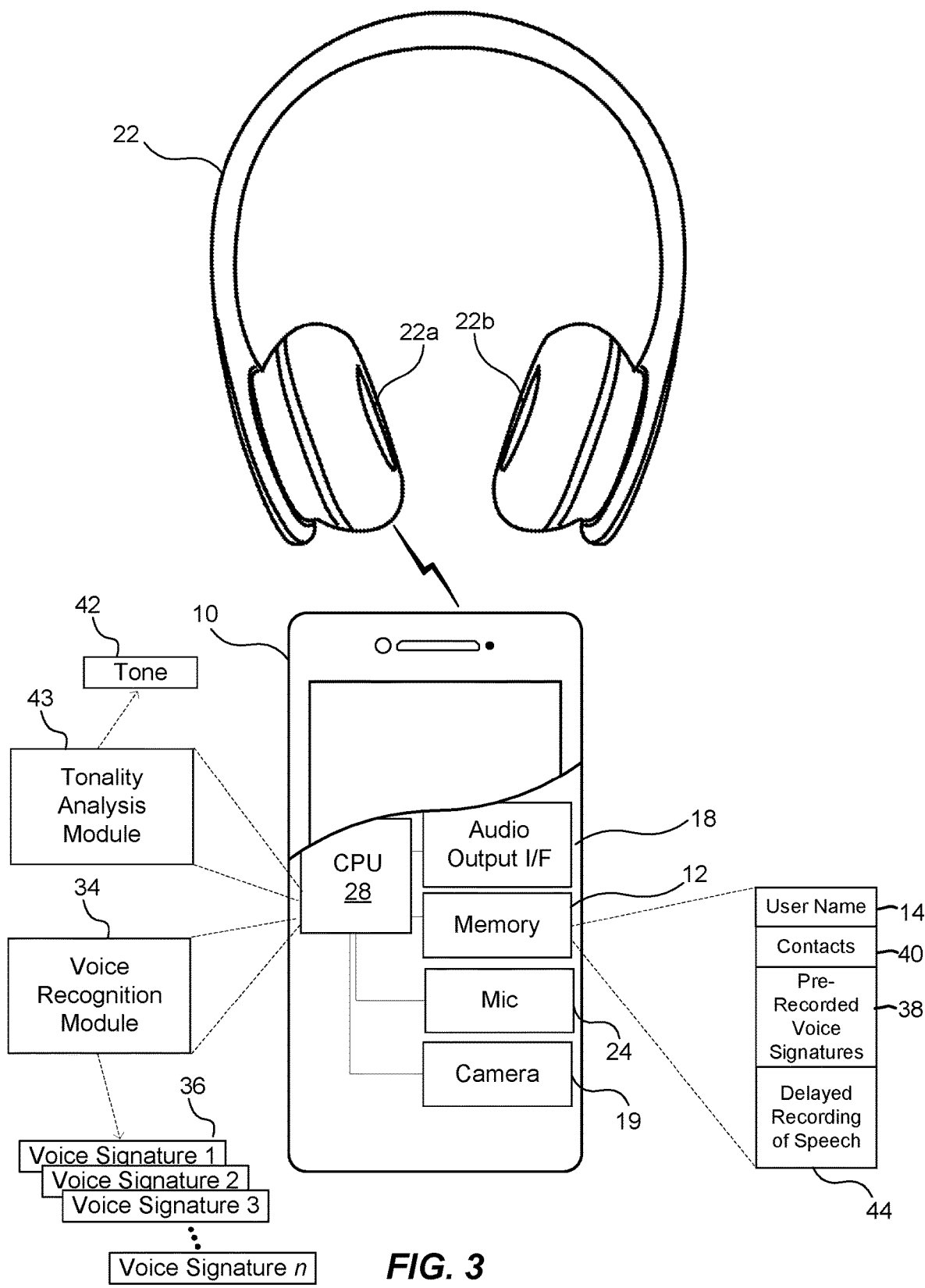
FIG. 3 is a schematic depiction of a mobile deice having a tonality analysis module for analyzing a tone of the speech.

In the embodiment depicted in FIG. 3, the processor 28 determines a tone 42 from the speech and generates the volume control signal 30 based on the tone 42. The tone of the speech is indicative of an emotional or psychological state of the person speaking to the user. The mobile device is able to extract the tone from the speech to infer the level of urgency of the person speaking. In the embodiment of FIG. 3, the processor 28 executes a tonality analysis module 43 configured to analyze intonations and inflections in the speech to determine the tone 42 of the speech. In one embodiment, the tone 42 is categorized as urgent or non-urgent. In one embodiment, the processor may be configured to react to an urgent tone by interrupting the audio signal whereas the processor may be configured to not react to a non-urgent tone, i.e. the processor does not interrupt the audio signal if the tone is not urgent. In a variant, the mobile device may learn how the user reacts to the interruptions to refine or calibrate the categorization of the tone as urgent or non-urgent. In a variant, the mobile device listens to the user's voice reply to the person speaking to refine or calibrate the categorization of the tone as urgent or non-urgent. For instance, the mobile device may capture the user's audible reply that he or she does not wish to be disturbed at that time. This would indicate that the tone of that last interruption should have been categorized as non-urgent. Conversely, if the mobile device captures the user's reply as being receptive to the interruption then the mobile device can categorize the tone as urgent.

In one embodiment, the volume control signal 30 mutes the volume 32 of the earphones 22, i.e. reduces the volume to zero. In another embodiment, the volume control signal 30 reduces the volume 32 of the audio signal 20 being played by the earphones 22. Reducing the volume may involve, for example, reducing the volume to less than a predetermined amount, e.g. to less than 50%, to less than 25%, to less than 10%, etc. The extent to which the volume is reduced in response to a name-recognition event is user-configurable in a variant. The muting may be symmetrical in both earphones or it may be asymmetrical, i.e. one earphone is muted while the other earphone is not muted. Similarly, the volume reduction may be symmetrical (same volume reduction in both earphones) or the volume reduction may be asymmetrical (the amount of volume reduction in the left earphone is different from the amount of volume reduction in the right earphone). In a variant, the mobile device asymmetrically mutes or asymmetrically reduces the volume in the earphones based on a sensed head orientation and a determination of which earphone is closer to the person speaking to the user. For example, if the mobile device determines that the left earphone is closer to the person speaking to the user, the left earphone may be muted or asymmetrically reduced in volume more than the right earphone. In another embodiment, the mobile device 10 plays a delayed recording 44 of the speech of the person speaking to the user through the earphones 22. The delayed recording in one embodiment is played once the volume has been either muted or reduced to a predetermined level to be audible over the audio signal 20 whose volume 32 has been reduced. In this embodiment, the mobile device records the speech of the person speaking to user of the mobile device and then either mutes or reduces the volume depending on the configuration of the mobile device. The delayed recording may be stored in the memory 12 of the mobile device. The delayed recording may be deleted after playing it to the user.

Another aspect is a method of automatically controlling a volume of earphones 22 connected to, or paired with, a mobile device 10. The method is performed by a processor 28 of the mobile device 10. The method comprises storing in a memory 12 of the mobile device 10 a name 14 of a user 16 of the mobile device 10. The user may be the owner or registered owner of the mobile device. The method comprises outputting an audio signal from an audio output interface 18 to the earphones 22 being worn by the user 16 of the mobile device 10. The earphones may be earbuds or headphones, whether wired or wireless. The method further comprises receiving, by a microphone 24, a sound signal external to the earphones. External to the earphones means that the source of the sound signal emanates from something other than the earphones such as a person speaking to the user. The method further comprises processing, by the processor 28, the sound signal to recognize speech in response to the processor 28 detecting that the audio output interface 18 is outputting the audio signal to the earphones 22. The method further comprises determining, by the processor 28, if the speech includes the name 14 of the user 16 stored in the memory 12 of the mobile device 10. The method further includes generating and providing, by the processor 28, a volume control signal to the audio output interface 18 to lower a volume of the earphones 22 in response to determining that the speech includes the name 14 of the user 16. Lowering the volume may also include muting the volume altogether.

In one implementation, the method comprises extracting a voice signature from the speech using the processor 28 and comparing, using the processor, the voice signature to a plurality of pre-recorded voice signatures associated with contacts of the user to identify one of the contacts 40 as a source of the speech. In this implementation of the method, the pre-recorded voice signatures and contacts are stored in the memory 12 of the mobile device 10. The method may involve determining whether to interrupt the audio signal to the earphones 22 based on an identity of the contact.

Figure 4:
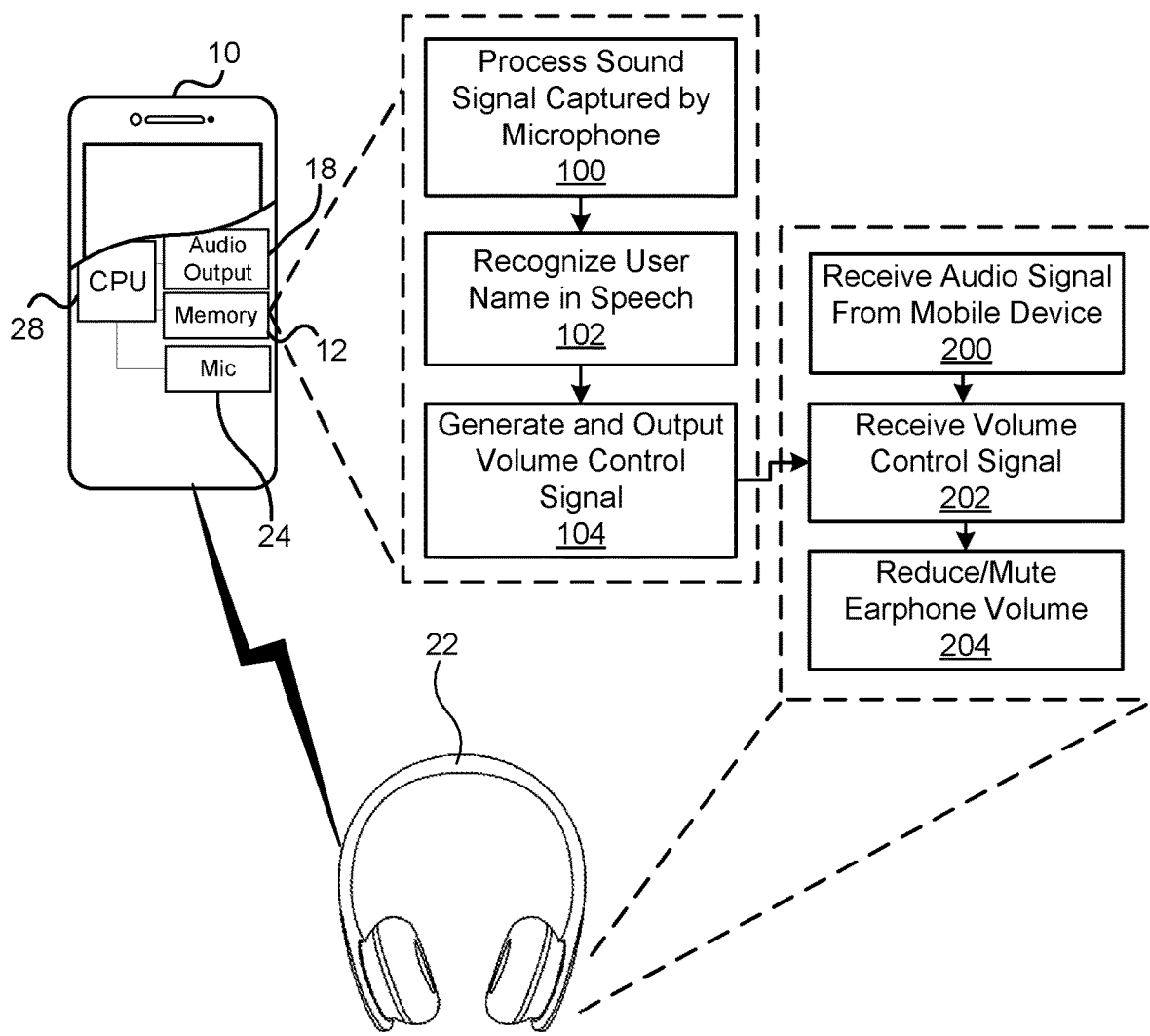
FIG. 4 depicts a method of controlling the earphone volume by a name-recognizing mobile device in accordance with one embodiment of the present invention.

FIG. 4 depicts a method of controlling the earphone volume in accordance with one embodiment. The method may be performed automatically by a processor or computer and thus without direct human intervention. As depicted in FIG. 4, the processor 28 performs a step, act or operation 100 of processing the sound signal. Prior to the step, act or operation 100, the method may involve activating a microphone and recording the sound signal with the microphone. Processing the sound signal enables the processor to identify words constituting elements of human speech. Once the sound signal has been processed at step, act or operation 100, a subsequent step, act or operation 102 entails recognizing the name of the user in the speech. A further step, act or operation 104 entails generating and outputting a volume control signal in response to identifying the name of the user of the mobile device. The earphones 22 connected to the mobile device 10 perform a related method. In this related method the earphones 22 receive an audio signal (wirelessly or by wired link) at step, act or operation 200. The audio signal contains audio content (e.g. music, TV, podcast, gaming, etc.) that is transformed by the speakers of the earphones into sound played to the user. At step, act or operation 202, the earphones 22 receive a volume control signal from the mobile device 10 in response to the mobile device detecting the name of the user in the captured speech signal. The volume control signal may be transmitted as part of the audio signal or as a separate signal. At step, act or operation 204, the earphones 22 reduce or mute the earphone volume in response to receiving the volume control signal.

Figure 5:
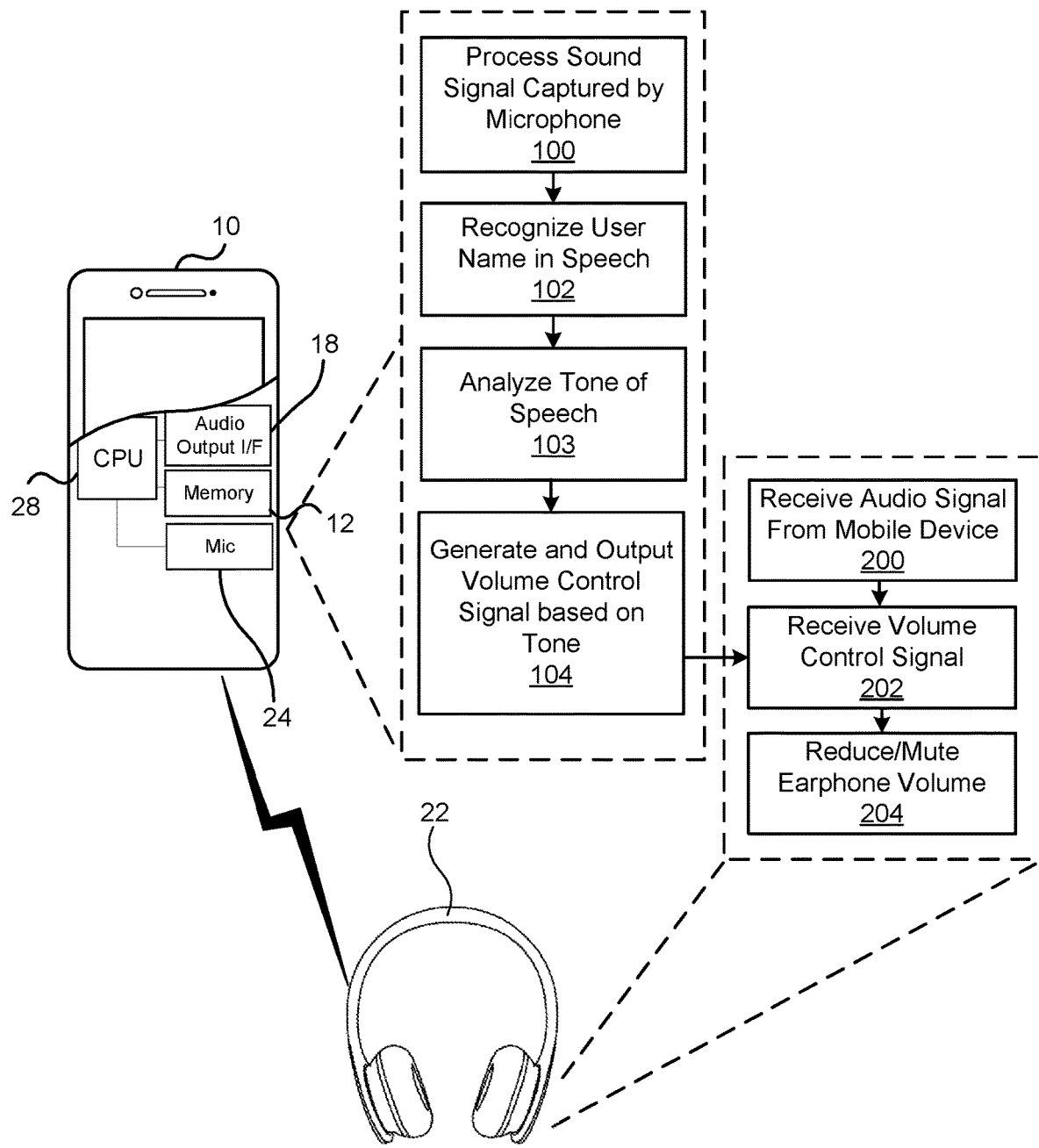
FIG. 5 is a method of controlling the earphone volume by a name-recognizing mobile device that is further configured to analyze a tone of the speech in accordance with another embodiment of the present invention.

FIG. 5 is a method of controlling the earphone volume by a name-recognizing mobile device 10 that is further configured to analyze a tone of the speech in accordance with another embodiment of the present invention. As depicted in FIG. 5, the mobile device 10 performs steps, acts or operations of processing the sound signal (step 100), recognizing the name of the user in the speech (step 102), analyzing a tone of the speech (step 103) and then generating and outputting a volume control signal 104 based on tone (and also optionally based on other factors) to the earphones. In this implementation, the earphones are concurrently playing audio content based on an audio signal received from the mobile device (step 200). The volume control signal is received at step 202 by the earphones which use this signal to control the volume or mute the volume at step 204.

Figure 6:
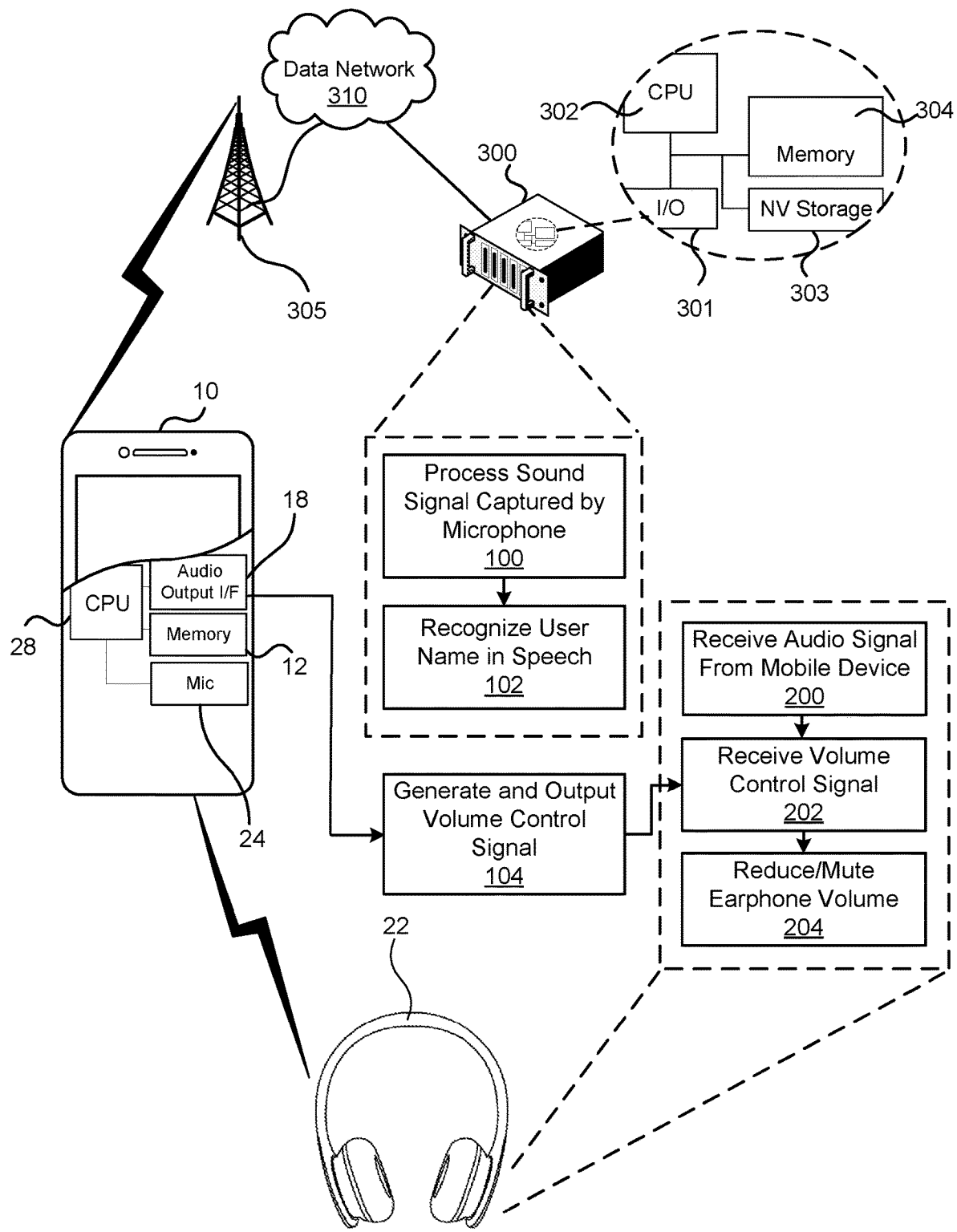
FIG. 6 is a method of the controlling the earphone volume in which the speech processing and name-recognition is performed by a server communicatively connected to the mobile device.

FIG. 6 is a method of controlling the earphone volume in which the speech processing and name-recognition is performed by a server (or other computing device) connected to the mobile device. In one implementation of this method, the server 300 is connected to the mobile device 10 via a base transceiver station 305 and a data network 310, e.g. the Internet. Alternatively, the server or computing device 300 may be local, e.g. connected via Bluetooth®, Wi-Fi® or some other local connection. The server 300 includes an input/output device (I/O) 301, a processor (CPU) 302, a non-volatile storage 303 and a memory 304. In this method, the mobile device 10 captures and digitizes the sound signal received by its microphone and then transmits or streams the digitized sound signal to the server through the Internet via cellular or Wi-Fi® connection. This offloads the computational load to the server and prolongs battery life. In this method, as depicted in FIG. 6, the server 300 performs steps, acts or operations of processing the sound signal (step 100), recognizing the name of the user in the speech (step 102), and then providing a response or analysis result to the mobile device 10 indicating that the name of the user has been recognized. In response to this response form the server 300, the mobile device 10 then generates and outputs a volume control signal (step 104) to the earphones 22. The earphones are concurrently playing audio content based on an audio signal received from the mobile device (step 200). The volume control signal is received at step 202 by the earphones which use this signal to control the volume or mute the volume at step 204.

Figure 7:
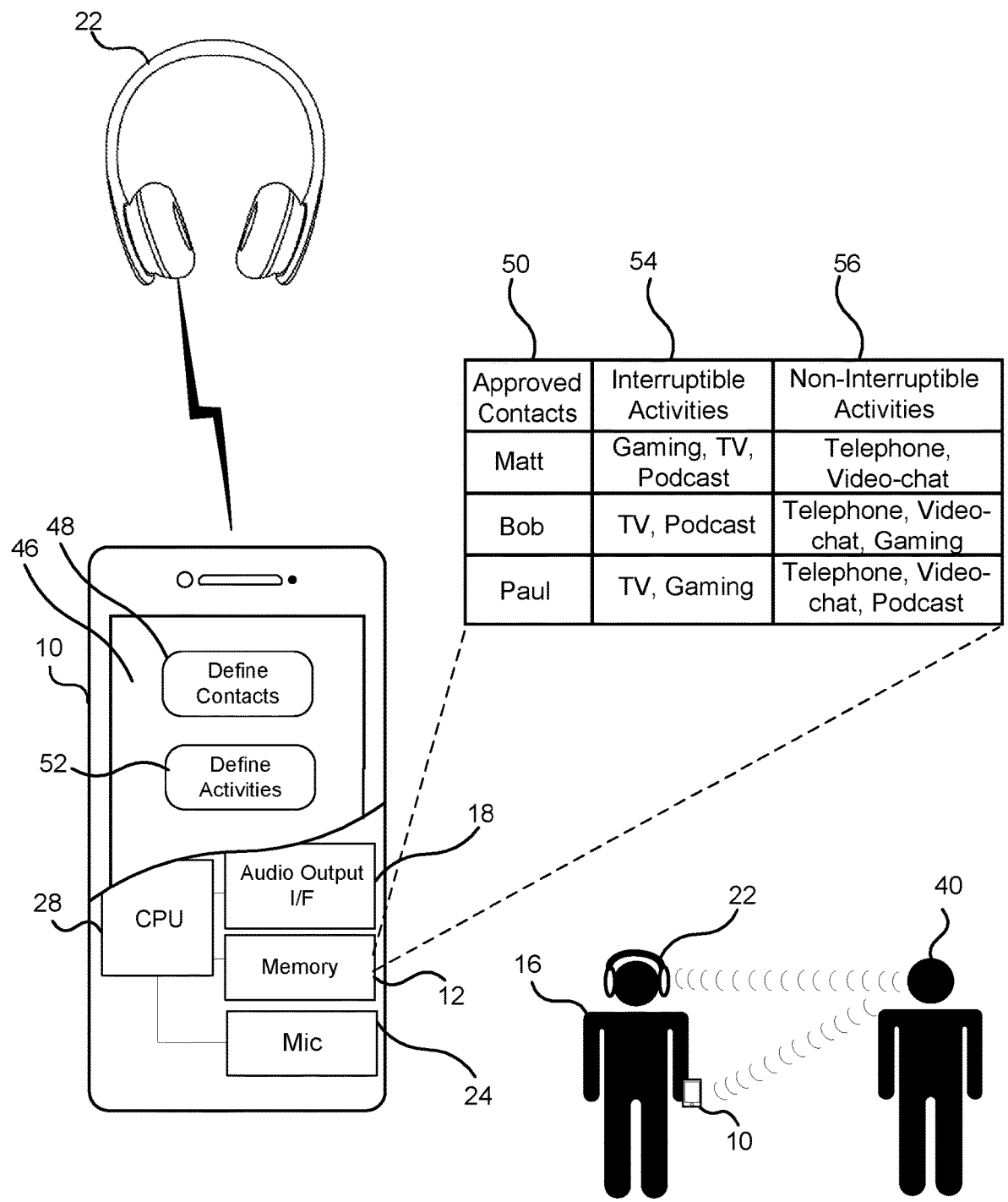
FIG. 7 depicts a mobile device having a user interface presenting a contact-defining user interface element to receive user input to define approved contacts who are authorized to interrupt the audio signal to the earphones.

In the embodiment depicted in FIG. 7, the mobile device 10 has a user interface 46 presenting a contact-defining user interface element 48 to receive user input to define approved contacts 50 who are authorized to interrupt the audio signal to the earphones 22. The user interface 46 may be a touchscreen, e.g. a touch-sensitive display screen such as an OLED touch-sensitive display screen. In the embodiment depicted in FIG. 7, the user interface 46 also presents an activity-defining user interface element 52 to receive user input to define interruptible activities 54 and non-interruptible activities 56.

In one embodiment, the interruptible activities 54 and non-interruptible activities 56 are user selectable from predetermined activities that include listening to music, watching TV, communicating via a voice channel of the mobile device 10, and communicating via video-chat. The predetermined activity may also include gaming, e.g. playing an Microsoft Xbox, Sony Playstation, etc. while wearing headphones. The user may also define important activities not to be interrupted, e.g. a special sporting event like the NFL Superbowl, FIFA World Cup Final, etc.

In another embodiment, non-work-related activities are defaulted to be interruptible activities 54 and work-related activities are defaulted to be non-interruptible activities 56. In one variant, the mobile device uses a calendar, e.g. a calendar stored in the memory of the mobile device, to define the non-work-related activities and work-related activities. For example, the calendar may indicate work time slots and/or holidays from which the mobile device can define times when the user may or may not be interrupted. In further implementation, the contacts who may be permitted to interrupt the user when the user is working or not working may be based on whether the contacts are work colleagues (work contacts) or friends (non-work contacts) and the time and/or location of the user.

The approved contacts 50 and the respective interruptible activities 54 and non-interruptible activities 56 may be stored as shown in FIG. 7 in the memory 12 of the mobile device 10. The user may thus define which contact may interrupt the user's audio signal based on what the user is currently doing. For example, contact Matt is authorized to interrupt the user during gaming, TV and podcasts but not during telephone calls or video-chats. Contact Bob is authorized to interrupt the user during TV and podcasts but not during gaming, telephone calls or video-chats. Contact Paul is authorized to interrupt the user during TV and gaming but not during telephone calls, video-chats or podcasts.

Figure 8:
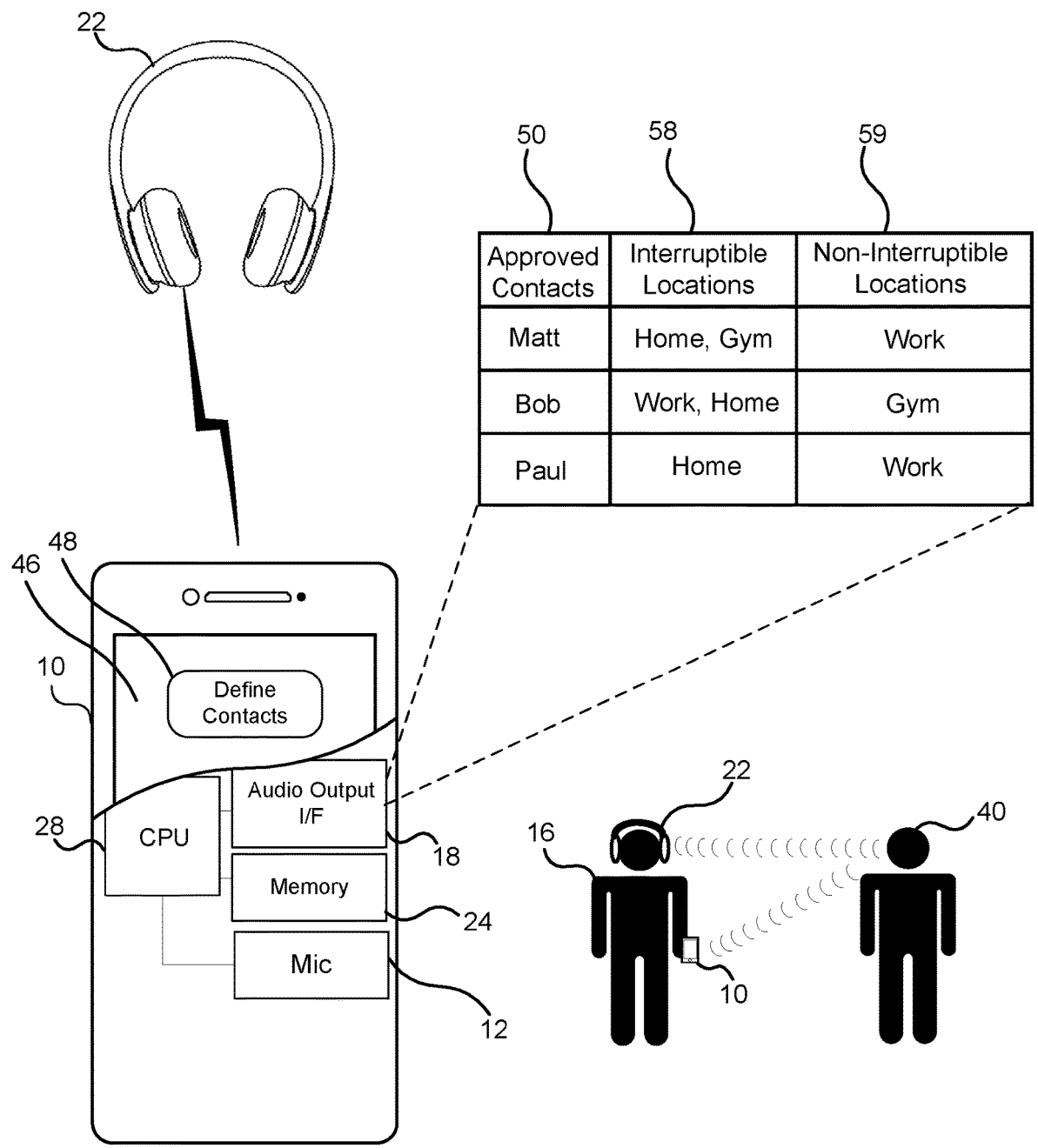
FIG. 8 depicts a mobile device storing approved contacts and respective locations where the approved contacts are authorized to interrupt the audio signal to the earphones.

FIG. 8 depicts the mobile device 10 storing in its memory 12 the approved contacts 50 and respective locations where the approved contacts are authorized to interrupt the audio signal to the earphones. In the embodiment depicted in FIG. 8, interruptible locations 58 and non-interruptible locations 59 are stored in the memory 12 in association with each of the approved contacts 50. The locations in this example are work, home and gym. Other locations may be selectable or definable as will be appreciated.

Figure 9:
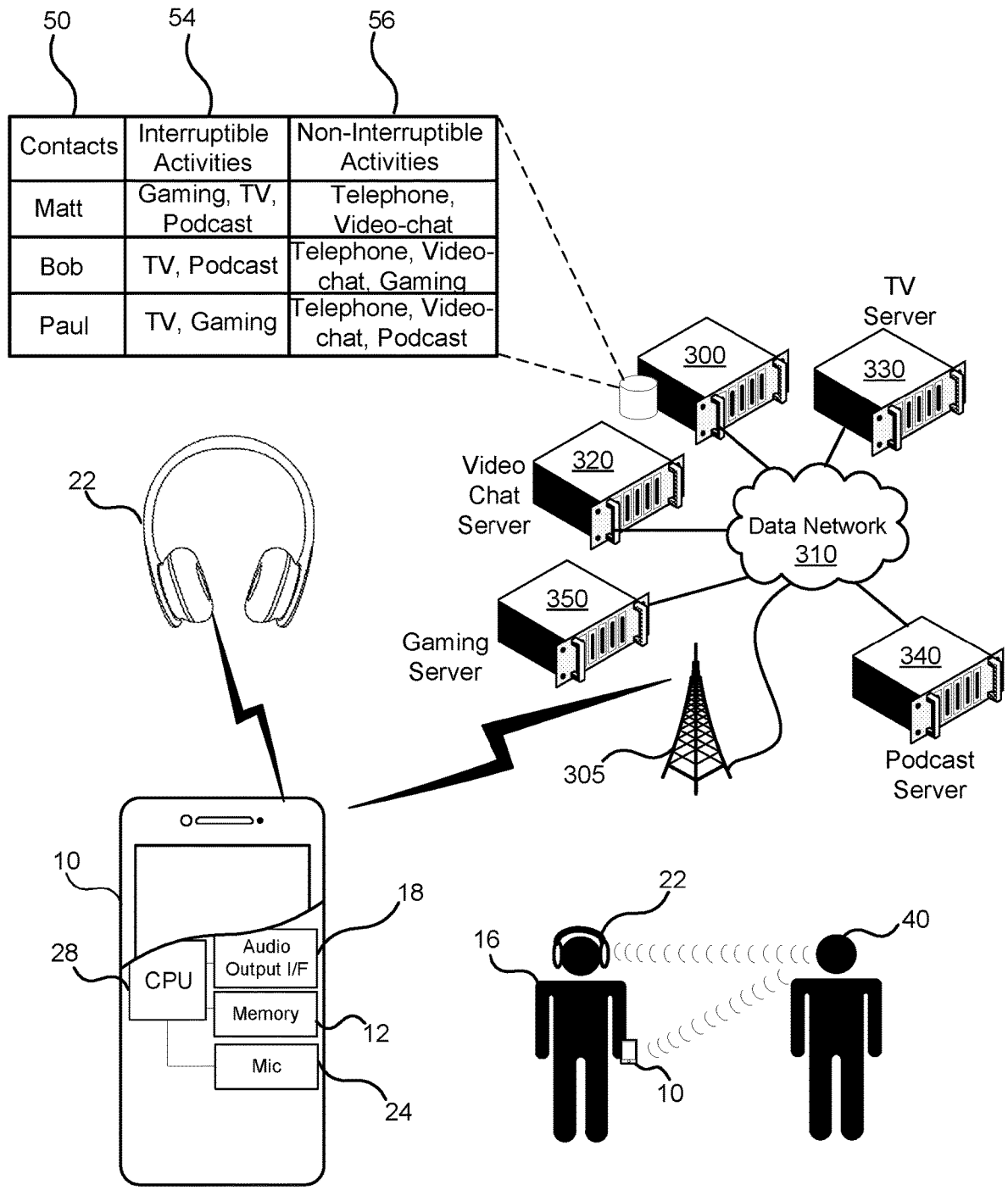
FIG. 9 depicts a system in which the mobile device cooperates with a server to define and store the approved contacts who are authorized to interrupt the audio signal to the earphones.

FIG. 9 depicts a system in which the mobile device 10 cooperates with a server 300 to define and store the approved contacts 50 who are authorized to interrupt the audio signal to the earphones 22. In the embodiment of FIG. 9, the mobile device 10 connects via the base transceiver station 305 and the data network 310 (e.g. the Internet) with the server 300. The mobile device 10 communicates with the server to define the approved contacts 50 and the respective interruptible activities 54 and non-interruptible activities 56. The mobile device 10 may silence the earphones as described above or, alternatively, send a volume suppression signal or mute request (or pause command) to any of one of the audio content servers to suppress or mute or pause the audio content being downloaded or streamed. For example, the mobile device may pause a podcast, TV show, movie, pause a game from a gaming server or even pause or put on hold a video chat or telephone call. The mobile device may thus in this embodiment send a volume suppression, audio mute or pause command to one of the video-chat server 320, TV server 330, podcast server 340, or gaming server 350 to halt, delay or pause the stream or delivery of content or to suppress or mute the audio portion or volume of the content. The mobile device may optionally also send a message, notification or alert to another party (i.e. to the computing device, phone, etc.) with whom the user is communicating when the interruption occurred to advise that the user has been interrupted such as, for example, a courtesy message, apology note, etc., or a request to reconnect/reschedule at a later time.

Figure 10:
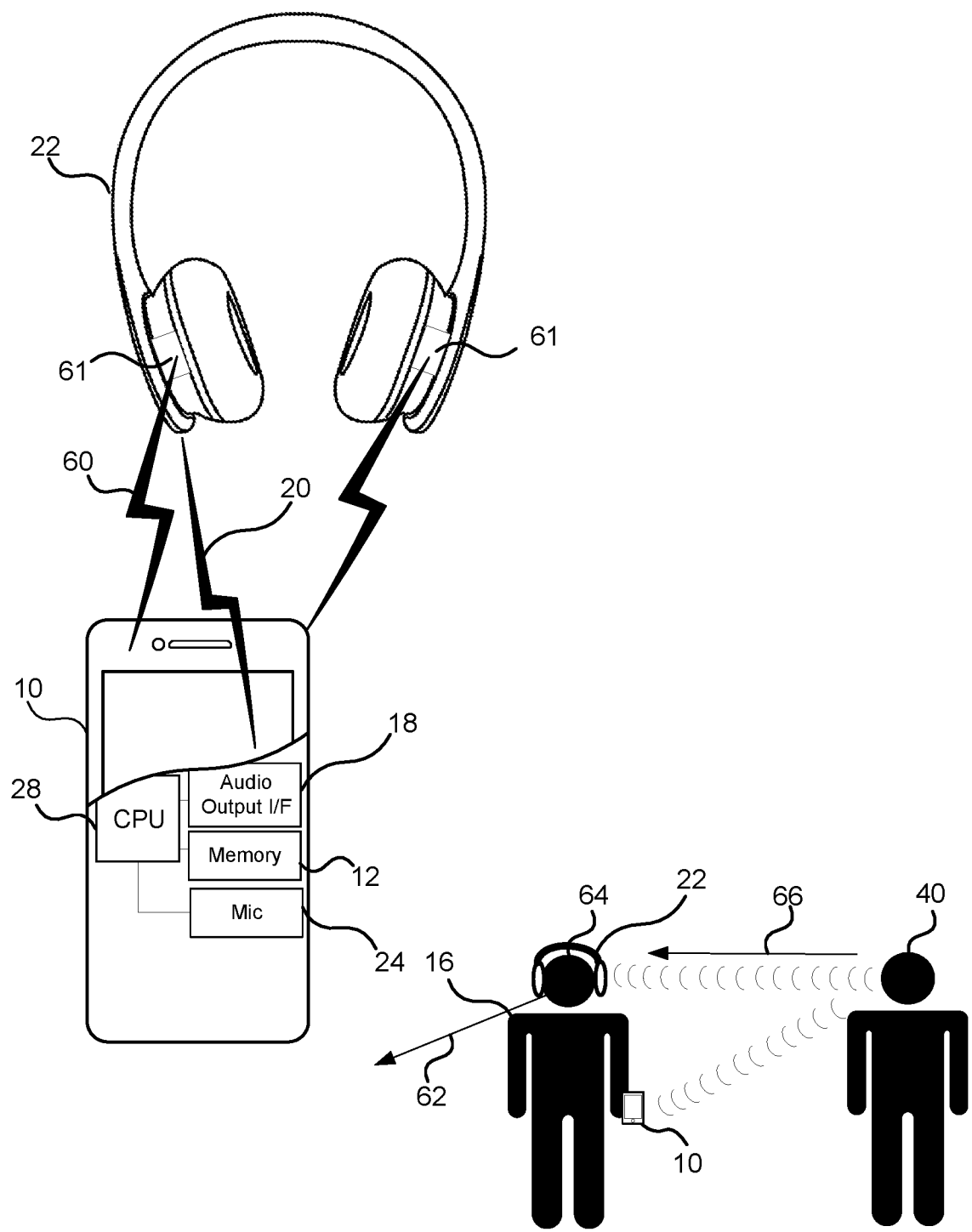
FIG. 10 depicts a mobile device configured to determine a head orientation of the user and to compare the head orientation with a direction of the sound signal.

In the embodiment depicted in FIG. 10, the processor 28 of the mobile device 10 receives an orientation signal 60 from an accelerometer or other orientation sensor 61 attached to or embedded within the earphones 22. The orientation signal 60 is representative of a head orientation 62 of a head 64 of the user 16. The processor 28 also determines a sound direction 66 from the sound signal 26. The processor 28 is further configured to compare the head orientation 62 of the head 64 of the user 16 with the sound direction 66 of the sound signal 26 to determine whether the user 16 is already facing a source of the sound signal 26. In this embodiment, the processor 28 only interrupts the audio signal 20 if the head orientation 62 is not facing the sound direction 66. In this scenario, the mobile device determines, concludes or infers that the user is not looking at the person speaking and is thus unaware that the person is trying to communicate with the user. However, if the user is facing the person speaking, the mobile device may be configured to presume that the user is intentionally ignoring the person speaking in which case the mobile device may, in this implementation, assume that the user does not wish to be interrupted. In a refinement, if the user has two mobile devices, one of which is a wearable device such as a watch, the mobile devices may cooperate to provide a more accurate determination of the sound direction by comparing sound direction computations or by triangulating the signals received by the two mobile devices.

In one embodiment, the processor 28 is configured to activate the microphone 24 in response to detecting that the audio output interface (I/F) 18 has been connected to the earphones 22. In another embodiment, the processor 28 is configured to activate the microphone 24 in response to detecting that there is another person's mobile device nearby, implying the presence of another person. In a variant, the mobile device of the user recognizes the identity of the person nearby by identifying the mobile device associated with that other person. In this situation, the mobile device of the user may not need to perform voice recognition to recognize the person speaking (assuming that this person is the only person within speaking range of the user).

Figure 11:
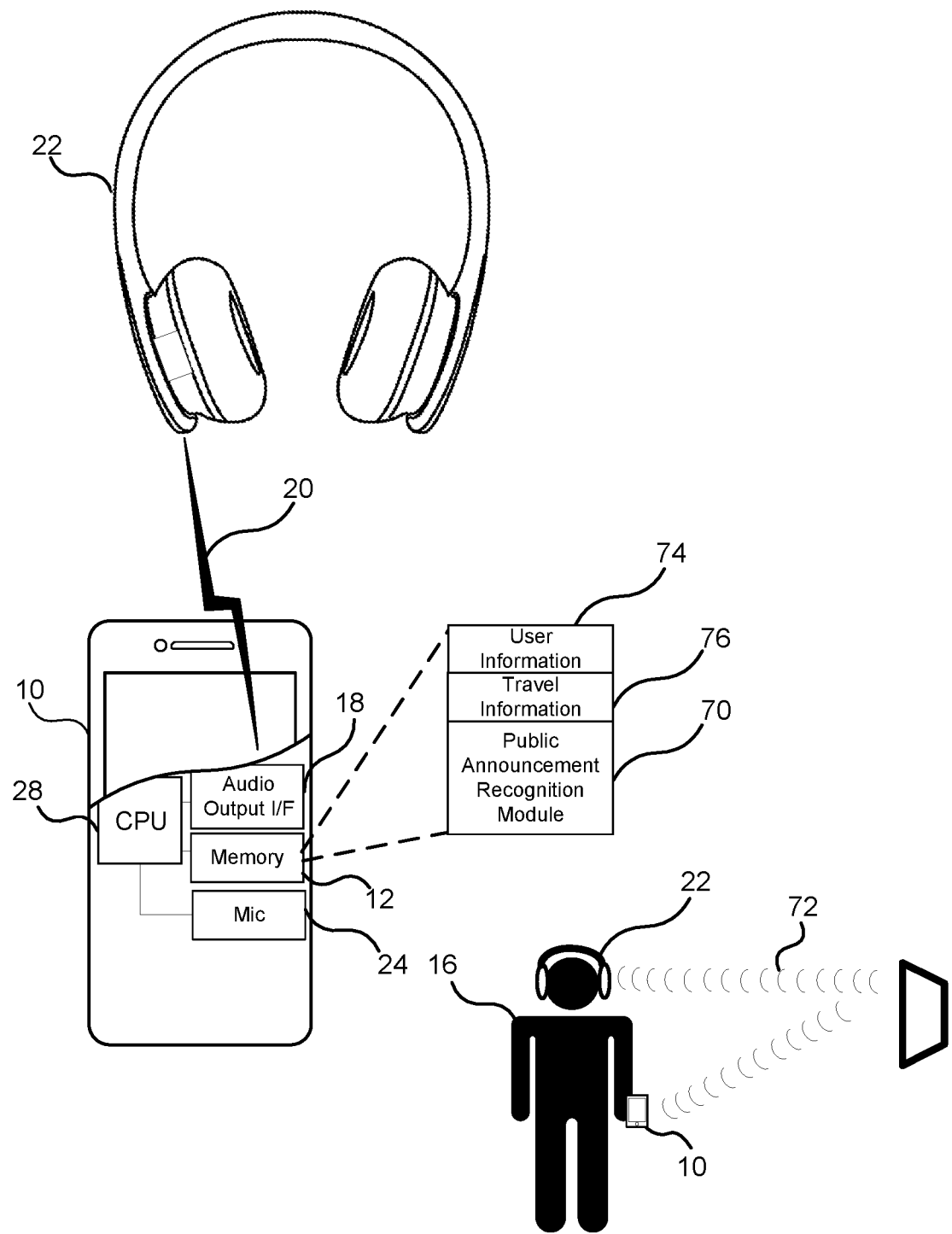
FIG. 11 depicts a mobile device configured to recognize a public announcement and to selectively interrupt the audio signal to the earphones for a relevant public announcement.

In the embodiment depicted in FIG. 11, the processor 28 executes a public announcement recognition module 70 that is configured to process the sound signal 26 to recognize a public announcement 72 that is relevant to the user 16 based on information 74 stored in the memory 12 of the mobile device 10, wherein the information 74 comprises travel information 76 stored in the memory 12 of the mobile device 10. The travel information may include travel times extracted from electronic tickets such as airline ticket, train tickets, etc. For example, the mobile device may determine that the user will soon board a flight because the mobile device contains an airline ticket for an imminent flight. If the public announcement contains flight information (e.g. a flight number, airline company name and/or corresponding destination) the mobile device may recognize the public announcement as being relevant to the user and may then interrupt the audio signal automatically to permit he user to hear the public announcement. alternatively, the mobile device may play a delayed recording of the public announcement. Alternatively, the mobile device may display a textual transcript of the public announcement.

Figure 12:
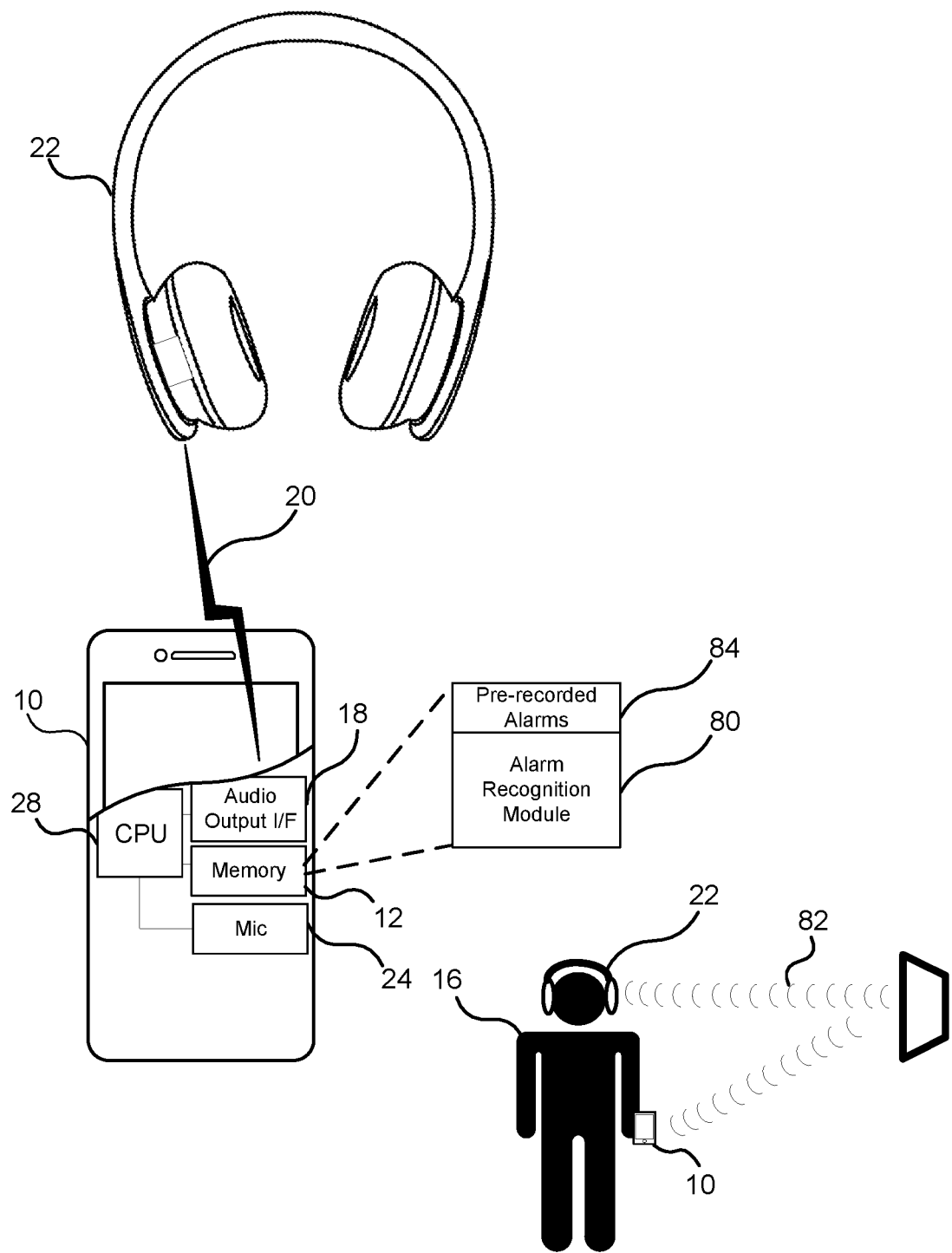
FIG. 12 depicts a mobile device configured to recognize pre-recorded alarms and to selectively interrupt the audio signal to the earphones for an alarm that matches one of the pre-recorded alarms.

In the embodiment depicted in FIG. 12, the processor 28 executes an alarm recognition module 80 that is configured to recognize an alarm 82 by processing the sound signal 26 to identify one of a plurality of pre-recorded alarms 84 stored in the memory 12 and to interrupt the audio signal 20 in response to the processor 28 detecting the one of the plurality of pre-recorded alarms 84 stored in the memory 12.

Figure 13:
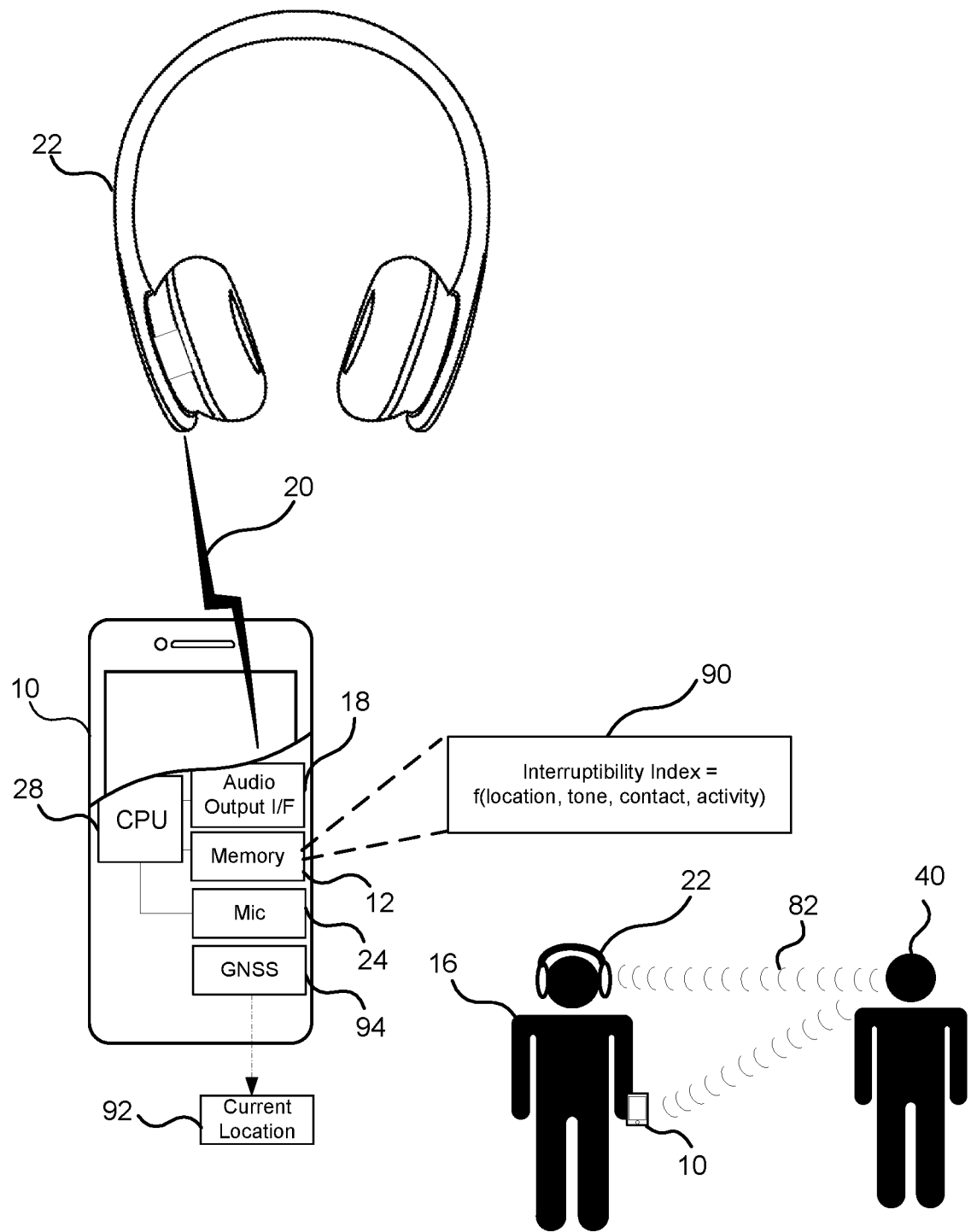
FIG. 13 depicts a mobile device configured to compute an interruptibility index based on multiple factors.

In another embodiment, the mobile device is configured to compute an interruptibility index based on multiple factors. The multiple factors in this embodiment may be selected from time, current, user activity, identity of contact, urgency of tone. In the embodiment depicted in FIG. 13, the processor 28 is configured to compute an interruptibility index 90 based on an urgency of a tone 42 of the speech, a type of audio signal 20 being supplied to the earphones 22 and an identity of the contact 40. In one embodiment, as shown in FIG. 13, the processor 28 is further configured to compute the interruptibility index 90 based on a current location 92 of the mobile device as determined by a location-determining subsystem, e.g. a Global Navigation Satellite System (GNSS) receiver 94 of the mobile device, e.g. a Global Positioning System (GPS) chip. In one embodiment, the processor 28 is further configured to compute the interruptibility index 90 based on whether the processor 28 infers that the user is walking or sitting. The mobile device may be user-configured to use those factors that the user sets as being relevant factors for computing the interruptibility index. The user may also set the mobile device on a do-not-disturb mode which can also be used to compute the interruptibility index. In one embodiment, the do-not-disturb mode may preclude all interruptions or only for selected activities, contacts, times, and/or locations etc.

In another aspect, the mobile device 10 includes the memory 12 for storing the name 14 of the user 16 of the mobile device as described above. As also described above, the audio output interface 18 outputs the audio signal 20 to the earphones 22 that are worn by the user 12. The earphones 22 comprise an always-on microphone 24a configured to receive the sound signal 26. In this embodiment, the earphones 22 are a headset having headphones and a permanently attached microphone 24a. The processor 28, as described above, is communicatively connected to the earphones 22 to process the sound signal 26 from the microphone 24a to recognize speech. The processor 28 is configured to determine if the speech includes the name 14 of the user 16 stored in the memory 12 of the mobile device 10. The processor 28 is configured to generate and provide the volume control signal 30 to the audio output interface 18 to lower the volume 32 of the earphones 22 in response to determining that the speech includes the name 14 of the user 16.

In one embodiment, as described above, the processor 28 is further configured to execute the voice-recognition module 34 to extract a voice signature 36 from the speech and to compare the voice signature 36 to a plurality of pre-recorded voice signatures 38 associated with contacts 40 of the user 16 to identify one of the contacts 40 as a source of the speech, wherein the pre-recorded voice signatures 38 and contacts 40 are stored in the memory 12 of the mobile device 10.

In one implementation, the mobile device may be configured to interrupt audio content playing via the earphones in response to detecting warning words or phrases whose content connote danger such as "fire", "watch out", "help", "take cover", etc. The warning words may be stored in the memory of the mobile device. The user may select which words or phrases the mobile device should treat as warnings from a preprogrammed list or suggested list. The user may add, edit or delete words or phrases in another embodiment. In a variant, the mobile device may include warning words in multiple languages.

In a further implementation, the mobile device may translate speech received by a person speaking to the user into a language understood by the user, as determined by a language setting of the mobile device. The mobile device in this implementation translates speech from a first language to a second language upon determining that the speech warrants interruption of the audio content being played in the earphones. For example, if a user who understands only English is traveling in Germany while listening to music or other audio content with his or her earphones and a German calls out a warning to the user (e.g. "Achtung!"), the mobile device may be configured to identify the speech as a warning based on the language (e.g. German) that is associated with the current location of the mobile device (e.g. Germany). The mobile device may be configured to determine that the tone and/or content of the speech warrants interruption and translates the warning into English. The mobile device lowers or mutes the volume of the music or other audio content in the earphones and then outputs the translated warning audibly in English through the earphones so the user may understand the warning.

The method(s) can be implemented in hardware, software, firmware or as any suitable combination thereof. That is, if implemented as software, the computer-readable medium comprises instructions in code which when loaded into memory and executed on a processor of a tablet or mobile device causes the tablet or mobile device to perform any of the foregoing method steps. These method steps may be implemented as software, i.e. as coded instructions stored on a computer readable medium which performs the foregoing steps when the computer readable medium is loaded into memory and executed by the microprocessor of the mobile device. A computer readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

For the purposes of interpreting this specification, when referring to elements of various embodiments of the present invention, the articles "a", "an", "the" and "said" are intended to mean that there are one or more of the elements. The terms "comprising", "including", "having", "entailing" and "involving", and verb tense variants thereof, are intended to be inclusive and open-ended by which it is meant that there may be additional elements other than the listed elements.

This new technology has been described in terms of specific implementations and configurations which are intended to be exemplary only. Persons of ordinary skill in the art will appreciate that many obvious variations, refinements and modifications may be made without departing from the inventive concepts presented in this application. The scope of the exclusive right sought by the Applicant(s) is therefore intended to be limited solely by the appended claims.

The invention claimed is:

1. A mobile device comprising:
a memory storing a name of a user of the mobile device;
an audio output interface for outputting an audio signal to earphones worn by the user of the mobile device;
a microphone configured to receive a sound signal external to the earphones; and
a processor communicatively connected to the microphone to process the sound signal to recognize speech in response to the processor detecting that the audio output interface is outputting the audio signal to the earphones, wherein the processor is configured to determine if the speech includes the name of the user stored in the memory of the mobile device;
wherein the processor is configured to generate and provide a volume control signal to the audio output interface to lower a volume of the earphones in response to determining that the speech includes the name of the user and plays a delayed recording of the speech through the earphones to be audible over the audio signal whose volume has been reduced,
wherein the processor is further configured to execute a voice-recognition module to extract a voice signature from the speech and to compare the voice signature to a plurality of pre-recorded voice signatures associated with contacts of the user to identify one of the contacts as a source of the speech, wherein the pre-recorded voice signatures and contacts are stored in the memory of the mobile device, wherein the processor is configured to lower the volume of the earphones only if the source of the speech is one of the contacts.

2. The mobile device of claim 1 wherein the processor is further configured to create the pre-recorded voice signatures from telephone calls, video calls or voice memos involving the contacts.

3. The mobile device of claim 1 wherein the processor is configured to execute a tonality analysis module to analyze the speech to determine a tone from the speech and to categorize the tone of the speech as either urgent or non-urgent, wherein the processor is configured to lower the volume of the earphones only if the tone of the speech is categorized as urgent.

4. The mobile device of claim 1 comprising a user interface that presents a contact-defining user interface element to receive user input to define and store in the memory approved contacts who are authorized to interrupt the audio signal to the earphones.

5. The mobile device of claim 1 comprising a user interface that presents an activity-defining user interface element to receive user input to define interruptible activities and non-interruptible activities.

6. The mobile device of claim 5 wherein the interruptible activities and non-interruptible activities are user selectable from predetermined activities that include listening to music, watching TV, communicating via a voice channel of the mobile device, and communicating via video-chat.

7. The mobile device of claim 5 wherein non-work-related activities are defaulted to be interruptible activities and work-related activities are defaulted to be non-interruptible activities.

8. The mobile device of claim 1 comprising a user interface that presents a contact-defining user interface element to receive user input to define and store in the memory a list of approved contacts and the interruptible activities that each contact is authorized to interrupt.

9. The mobile device of claim 1 wherein the processor receives an orientation signal from the earphones representative of a head orientation of a head of the user and wherein the processor also determines a sound direction from the sound signal, and wherein the processor is further configured to compare the head orientation of the head of the user with the sound direction of the sound signal to determine whether the user is already facing a source of the sound signal, wherein the processor only interrupts the audio signal if the head direction is not facing the sound direction, and wherein the processor asymmetrically reduces the volume in the earphones based on the head orientation and the sound direction.

10. The mobile device of claim 1 wherein the processor executes a public announcement recognition module that is configured to recognize a public announcement that is relevant to the user based on information stored in the memory of the mobile device, wherein the information comprises travel information stored in the memory of the mobile device.

11. The mobile device of claim 1 wherein the processor executes an alarm recognition module that is configured to recognize an alarm by processing the sound signal to identify one of a plurality of pre-recorded alarms stored in the memory and to interrupt the audio signal in response to the processor detecting the one of the plurality of pre-recorded alarms stored in the memory.

12. The mobile device of claim 1 wherein the processor is configured to compute an interruptibility index based on an urgency of a tone of the speech, a type of audio signal being supplied to the earphones and an identity of the contact, wherein the processor is configured to use the interruptibility index to determine whether or not to lower the volume of the earphones.

13. The mobile device of claim 12 wherein the processor is further configured to compute the interruptibility index based on a current location of the mobile device as determined by a location-determining subsystem of the mobile device.

14. The mobile device of claim 13 wherein the processor is further configured to compute the interruptibility index based on whether the processor infers that the user is walking or sitting.

15. The mobile device of claim 3 wherein the processor cooperates with the microphone to capture a voice reply of the user to the speech to thereby refine or calibrate a categorization of the tone of the speech as urgent or non-urgent.

16. The mobile device of claim 10 wherein the processor causes the mobile device to display a textual transcript of the public announcement.

17. A mobile device comprising:
a memory storing a name of a user of the mobile device;
an audio output interface for outputting an audio signal to earphones worn by the user of the mobile device, wherein the earphones comprise an always-on microphone configured to receive a sound signal; and
a processor communicatively connected to the earphones to process the sound signal from the microphone to recognize speech, wherein the processor is configured to determine if the speech includes the name of the user stored in the memory of the mobile device;
wherein the processor is configured to generate and provide a volume control signal to the audio output interface to lower a volume of the earphones in response to determining that the speech includes the name of the user and wherein the processor is further configured to play a delayed recording of the speech through the earphones to be audible over the audio signal whose volume has been reduced,
wherein the processor is further configured to execute a voice-recognition module to extract a voice signature from the speech and to compare the voice signature to a plurality of pre-recorded voice signatures associated with contacts of the user to identify one of the contacts as a source of the speech, wherein the pre-recorded voice signatures and contacts are stored in the memory of the mobile device, wherein the processor is configured to lower the volume of the earphones only if the source of the speech is one of the contacts.

18. The mobile device of claim 17 wherein the processor is configured to recognize a foreign-language warning in the speech and to lower the volume of the earphones in response to the foreign-language warning.

\* \* \* \* \*